US006945150B2

United States Patent
Chang

(10) Patent No.: US 6,945,150 B2
(45) Date of Patent: Sep. 20, 2005

(54) FEEDING DEVICE FOR A TABLE SAW

(76) Inventor: Chin-Chin Chang, No. 41, Nan-Tsun Rd., Hou-Li Hsiang, Taichung Hsien (TW)

( * ) Notice: Subject to any disclaimer, the term of this patent is extended or adjusted under 35 U.S.C. 154(b) by 137 days.

(21) Appl. No.: 10/660,378

(22) Filed: Sep. 11, 2003

(65) Prior Publication Data

US 2005/0056130 A1 Mar. 17, 2005

(51) Int. Cl.[7] .................................................. B26D 7/06
(52) U.S. Cl. ...................... 83/435.12; 83/477.2; 83/581
(58) Field of Search ........................... 83/477.2, 435.12, 83/435.13, 435.14, 581, 435.11, 437.1, 425, 444, 448–450; 144/287

(56) References Cited

U.S. PATENT DOCUMENTS 2,916,063 A * 12/1959 Boekenkamp ........... 144/136.1
5,293,802 A * 3/1994 Shiotani et al. ............ 83/468.7

* cited by examiner

Primary Examiner—Allan N. Shoap
Assistant Examiner—Isaac Hamilton

(57) ABSTRACT

A feeding device for a table saw includes a sliding board slidably mounted on one side of a worktable of the table saw and having a moving direction corresponding to a saw blade. The sliding board includes two grooves defined in two opposite sides thereof and respectively parallel to the moving direction of the sliding board. A moving seat is selective slidably mounted on one side of the sliding board. A pushing rod is laterally slidably mounted to the moving seat and has a first side forming a pushing face for abutting against a datum of a workpiece. A first locking device and a second locking device respectively extend through the pushing rod and the moving seat to selectively hold the pushing rod and the moving seat in place for confirming a cutting angle of the workpiece.

11 Claims, 6 Drawing Sheets

FEEDING DEVICE FOR A TABLE SAW

BACKGROUND OF THE INVENTION

1. Field of the Invention

The present invention relates to a feeding device, and more particularly to feeding device for a table saw. The feeding device of the present invention can be used to a long distance cutting.

2. Description of Related Art

A conventional feeding device for a table saw comprises a moving seat slidably mounted on one side of a worktable of the table saw. A graduation plate is partially rotatably mounted to the moving seat and a pushing rod laterally extends from the graduation plate for abutting against a datum of a workpiece. A threaded rod upwards extends from the moving seat and penetrates through the graduation plate. A nut is screwed onto the threaded rod to hold the graduation plate in place after adjusting an operating angle.

However, the adjusting range of the graduation plate on the conventional feeding device for a table saw is smaller than 180 degrees. Consequently, the conventional feeding device for a table saw is useless when the workpiece is greater than the distance between the pushing rod and the saw blade. Furthermore, the quality of cutting cannot be effectively controlled when the nut is loosened from the threaded rod due to a vibration of the table saw during operating. Consequently, the conventional feeding device for a table saw in accordance with the prior art needs to be advantageously altered.

The present invention has arisen to mitigate and/or obviate the disadvantages of the conventional feeding device for a table saw.

SUMMARY OF THE INVENTION

The main objective of the present invention is to provide an improved feeding device for a table saw. The feeding device of the present invention can be used to a long distance cutting.

To achieve the objective, the feeding device for a table saw in accordance with the present invention comprises a sliding board slidably mounted on one side of a worktable of the table saw and having a moving direction corresponding to a saw blade. The sliding board includes two grooves defined in two opposite sides thereof and respectively parallel to the moving direction of the sliding board. A moving seat is selective slidably mounted on one side of the sliding board. A pushing rod is laterally slidably mounted to the moving seat and has a first side forming a pushing face for abutting against a datum of a workpiece. A first locking device and a second locking device respectively extend through the pushing rod and the moving seat to selectively hold the pushing rod and the moving seat in place for confirming a cutting angle of the workpiece.

Further benefits and advantages of the present invention will become apparent after a careful reading of the detailed description with appropriate reference to the accompanying drawings.

DETAILED DESCRIPTION OF THE INVENTION

Figure 1:
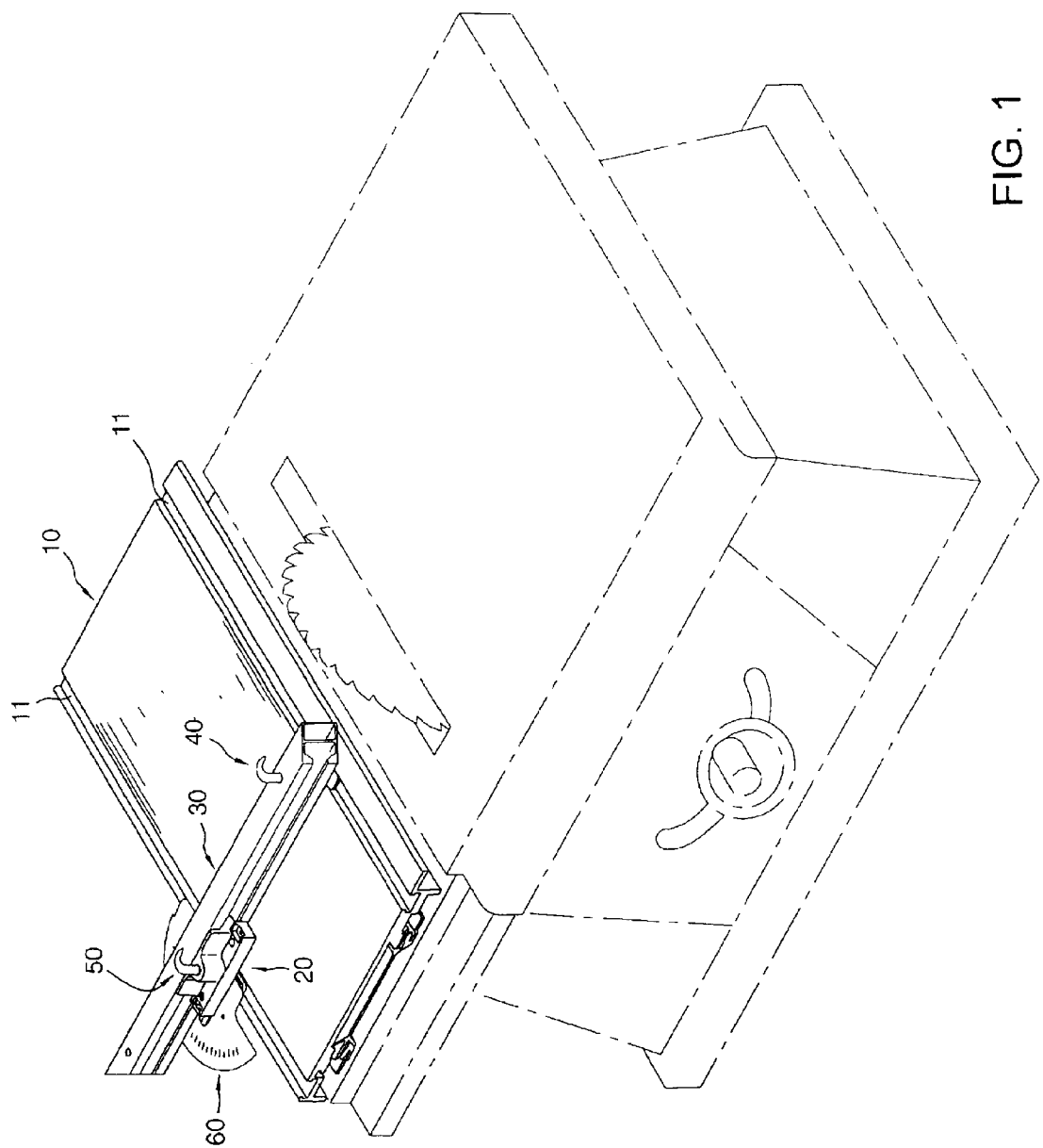
FIG. 1 is a perspective schematic view of a feeding device for a table saw in accordance with the present invention.
Figure 2:
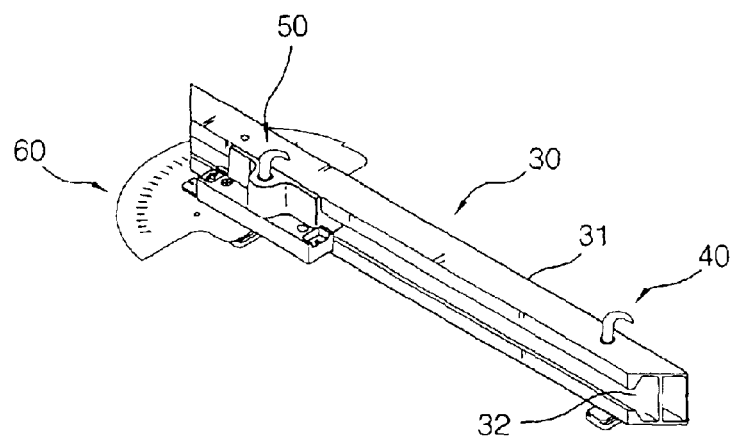
FIG. 2 is a partially perspective view of the feeding device in FIG. 1.
Figure 3:
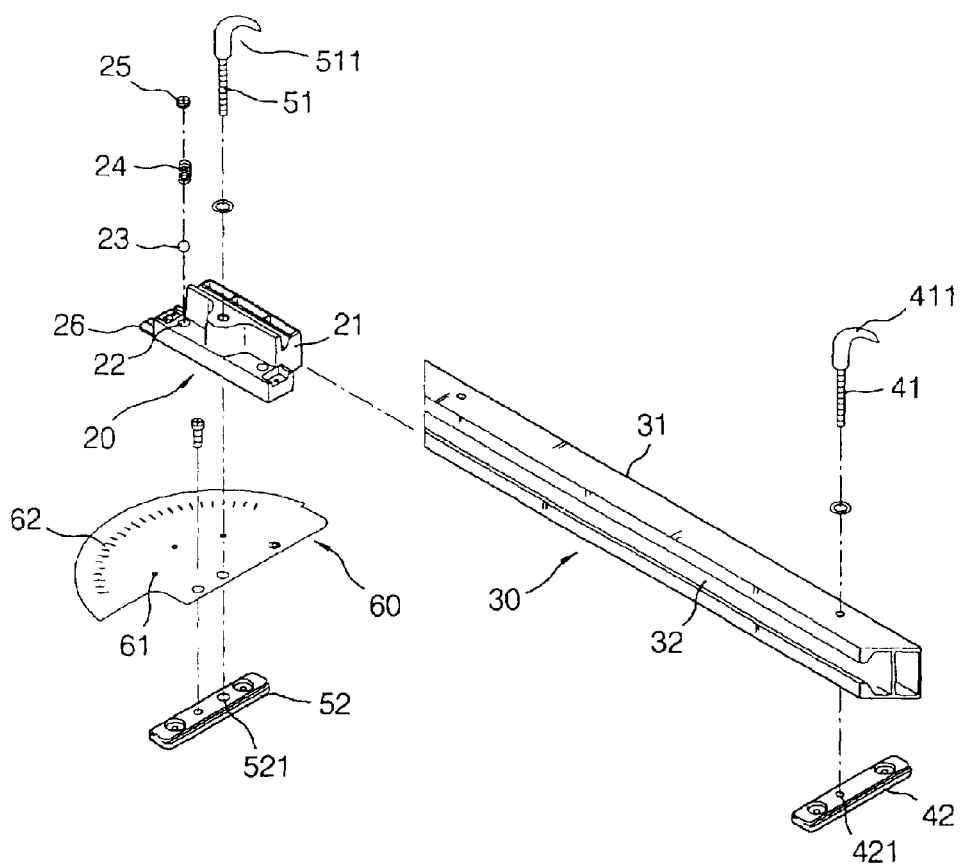
FIG. 3 is a partially exploded perspective view of the feeding device in FIG. 1.

Referring to the drawings and initially to FIGS. 1–3, a feeding device for a table saw in accordance with the present invention comprises sliding board (10) adapted to be slidably mounted on one side of a worktable of the table saw and having a moving direction adapted to correspond to a saw blade of the table saw. A moving seat (20) is selectively slidably mounted on one side of the sliding board (10). A pushing rod (30) is laterally slidably mounted to the moving seat (20). A first locking device (40) and a second locking device (50) respectively extend through the pushing rod (30) and the moving seat (20) for confirming a cutting angle of a workpiece. A graduation plate (60) is securely mounted to a bottom of the moving seat (20).

The sliding board (10) includes two grooves (11) defined in two opposite sides thereof. The two grooves (11) are respective parallel to the moving direction of the sliding board (10).

The moving seat (20) includes a rail (21) laterally extending therefrom and having a T-shaped cross-section. A bore (22) is defined in and extending through the moving seat (20). A steel ball (23) is movably received in the bore (22) and partially extending through a bottom of the moving seat (20). A spring (24) is longitudinally compressively received in the bore (22) and a bolt (25) is partially screwed into the bore (22) to hold the spring (24) and the steel ball (23) in place. An indicator (26) is detachably mounted to a first end of the moving seat (20) for indicating the rotating angle when the moving seat (20) is rotatably moved relative to the graduation plate (60).

The pushing rod (30) includes a first side and a second side opposite to the first side of the pushing rod (30). The first side of the pushing rod (30) forms a pushing face (31) adapted to abut against the workpiece and the second side of the pushing rod (30) has a sliding groove (32) laterally defined in the pushing rod (30). The sliding groove (32) includes a cross-section having a shape corresponding to that of the rail (21). The rail (21) of the moving seat (20) is slidably received in the sliding groove (32) in the pushing rod (30) such that the pushing rod (30) can be moved relative to the moving seat (20) when the first locking device (40) is detached from the pushing rod (30) and the second locking device (50) is loosened.

A distance between the first locking device (40) and the saw blade of the table saw is shorter than that between the second locking device (50) and the saw blade of the table saw. The first locking device (40) includes a threaded rod (41) rotatably extending through the pushing rod (30). The threaded rod (41) has a handle (411) extending therefrom for easily operating the threaded rod (41). The handle (411) has a diameter greater than that of the threaded rod (41) and abuts on a top surface of the pushing rod (30). A sliding block (42) is slidably received in a corresponding one of the two grooves (11) in the sliding board (10) and has a threaded hole (421) defined in the sliding block (42). The threaded hole (421) extending through the sliding block (42) and the threaded rod (41) screwed into the threaded hole (421) to hold the sliding block (42) in place. The second locking device (50) is the same as the first locking device (40). The second locking device (50) has a threaded rod (51) extending through the moving seat (20) and having a handle (511) extending from the threaded rod (51). A sliding block (52) is slidably received in a corresponding one of the two grooves (11) in the sliding board (10). The sliding block (52) of the second locking device (50) has a threaded hole (521) defined therein and extending through the sliding block (52). The threaded rod (51) of the second locking device (50) is screwed into threaded hole (521) in the sliding block (52) of the second locking device (50) to hold the sliding block (52) of the second locking device (50) in place.

The graduation plate (60) is attached to the sliding block (52) of the second locking device (50). The graduation plate (60) has a multiple dimples (61) defined therein for partially receiving the steel ball (23). Each dimple (61) is situated on a certain angle for quickly orientating the moving seat (20) and the pushing rod (30) in the certain angle. The graduation plate (60) has a series of scales (62) formed on an arc edge thereof and corresponding to the indicator (26) of the moving seat (20) for indicating the operating angle of the moving seat (20) and the pushing rod (30).

Figure 4:
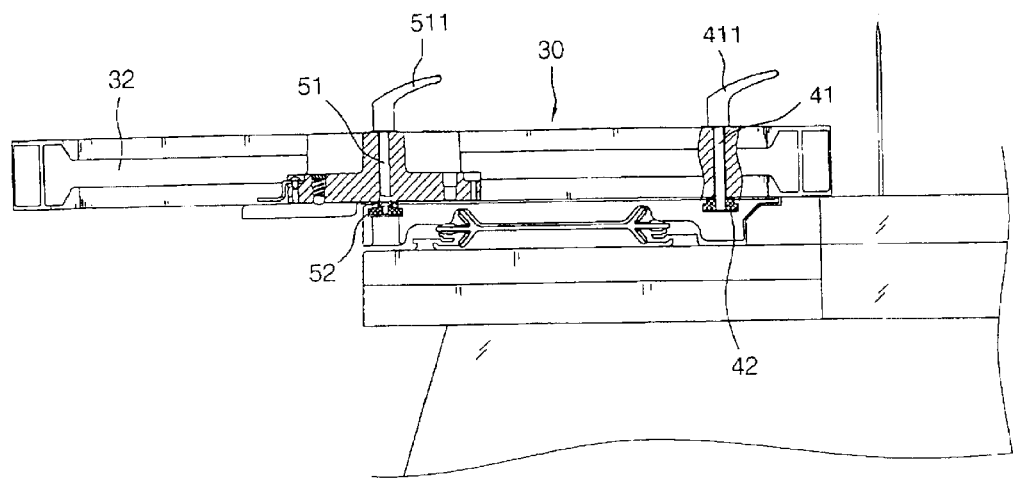
FIG. 4 is a front plan view in partial cross-section of the feeding device in FIG. 1.
Figure 5:
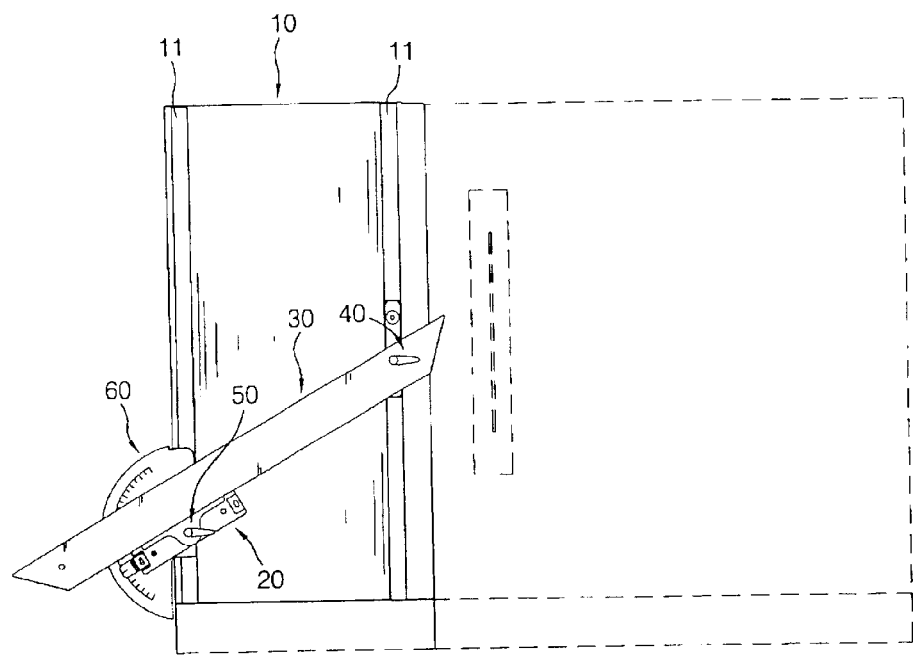
FIG. 5 is a top plan view of the feeding device in FIG. 1.

With reference to FIGS. 4 and 5, the moving seat (20) and the pushing rod (30) can freely adjusting the operating angle when the first locking device (40) and the second locking device (50) are loosened. The user can clearly read the operating angle via the indicator (26) and the series of scales (62) on the graduation plate (60) when the moving seat (20) and the pushing rod (30) is adjusted.

Figure 6:
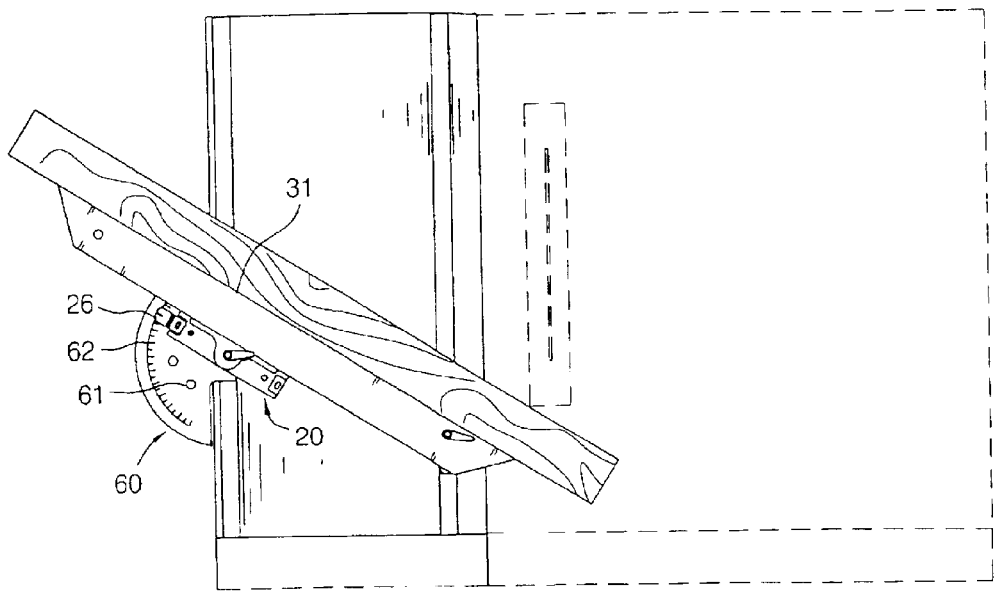
FIG. 6 is an operational top plan view of the feeding device in FIG. 1 for a short distance cutting.
Figure 7:
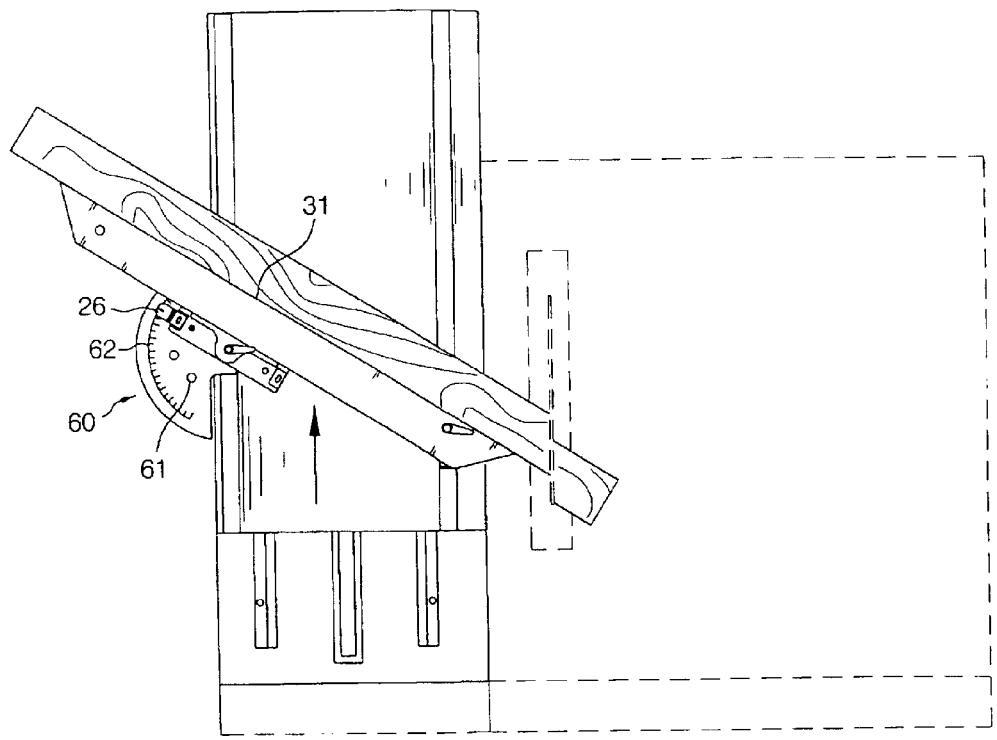
FIG. 7 is an operational top plan view of the feeding device in FIG. 6 when the feeding is forwards moved.
Figure 8:
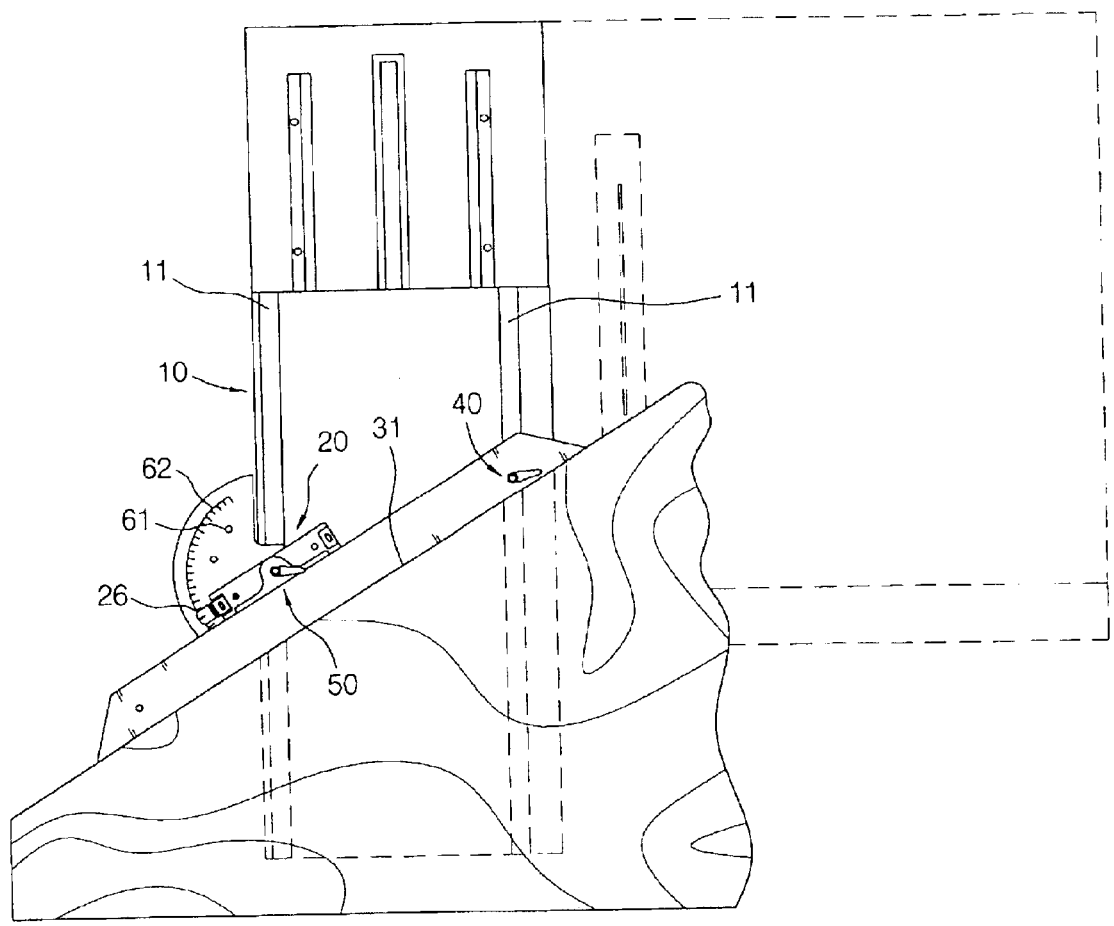
FIG. 8 is an operational top plan view of the feeding device in FIG. 1 for a long distance cutting.
Figure 9:
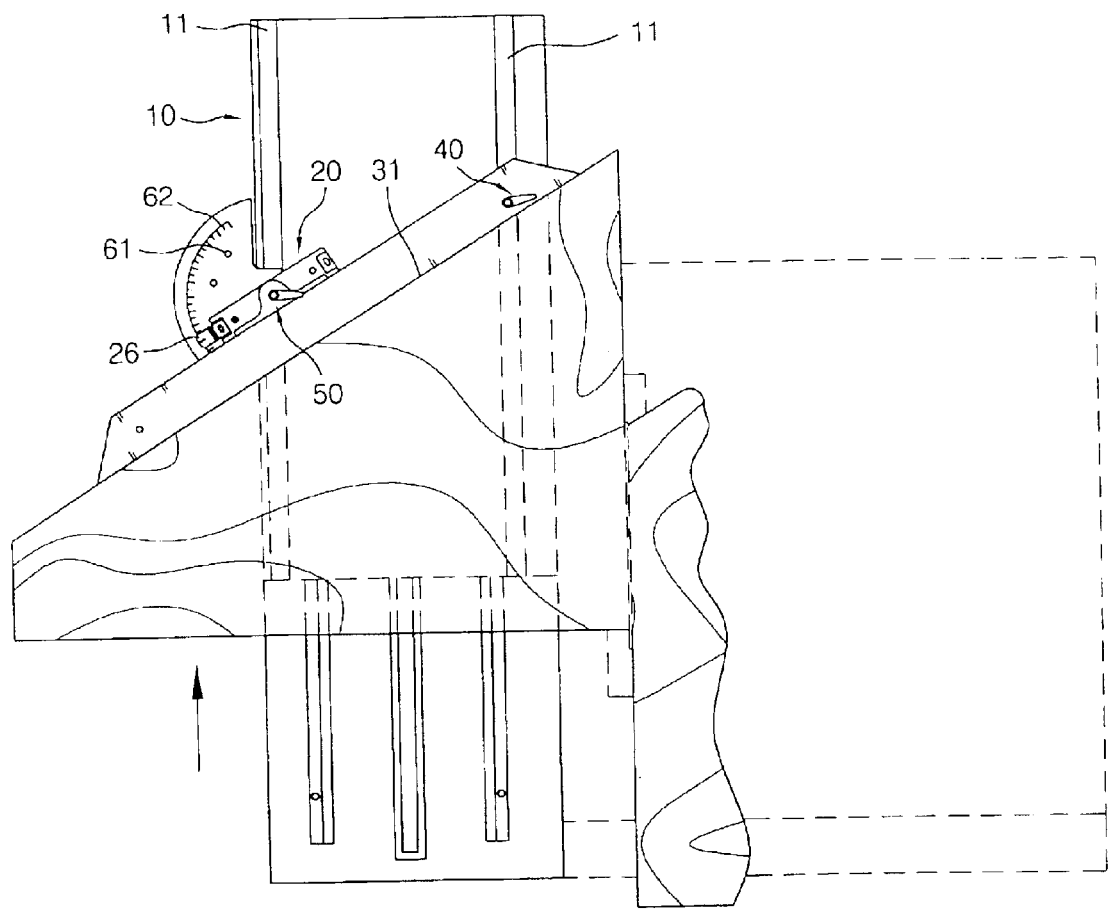
FIG. 9 is an operational top plan view of the feeding device in FIG. 8 when the feeding is forwards moved.

With reference to FIGS. 6 and 7, the pushing face (31) forwards abuts against a datum of the workpiece for a short distance cutting. With reference to FIGS. 8 and 9, the indicator (26) is detached from the moving seat (20) and attached to a second end of the moving seat (20). The threaded rod (41) is detached from the sliding block (42) and the pushing rod (30) and the threaded rod (51) of the second locking device (50) is loosened. The threaded rod (41) of the first locking device (40) is screwed into threaded hole (421) in the sliding block (42) of the first locking device again to hold the sliding block (42) of the first locking device (40) in place after the moving seat (20) turning about 180 degrees and the threaded rod (51) of the second locking device (50) being tightened again. Then, the pushing face (31) of the pushing rod (30) backward abuts a datum of workpiece that needs a long distance cutting. For the long distance cutting, the user forwards pushes the workpiece with the feeding device of the present invention to finish the long distance cutting of the workpiece.

As described above, the feeding device for a table saw in accordance with the present invention has the following advantages.

1. The work range of the feeding device of the present invention is greater than that of the conventional feeding device for a table saw. The feeding device can be provided for a great workpiece that needs a long distance cutting after turning the moving seat (20) about 180 degrees.

2. The first locking device (40) and the second locking device (50) provide a stable support to the pushing rod (30) during cutting.

3. The first locking device (40) and the second locking device (50) hardly automatically loosen at the same time such that the relation between the pushing rod (30) and the moving seat (20) is stable.

4. The operating angle of the feeding device is easily adjusted because the user only needs to loosen the first locking device (40) and the second locking device (50) before adjusting the operating angle of the feeding device in accordance with the present invention.

Although the invention has been explained in relation to its preferred embodiment, it is to be understood that many other possible modifications and variations can be made without departing from the spirit and scope of the invention as hereinafter claimed.

What is claimed is:

1. A feeding device for a table saw comprising:
   a sliding board adapted to be slidably mounted on one side of a worktable of the table saw and having a moving direction corresponding to a saw blade of the table saw, the sliding board including two grooves defined in two opposite sides thereof, the two grooves respectively parallel to the moving direction of the sliding board;
   a moving seat selectively slidably mounted on one side of the sliding board;
   a pushing rod laterally slidably mounted to the moving seat and having a first side forming a pushing face adapted to abut against a datum of a workpiece; and
   a first locking device and a second locking device respectively extending through the pushing rod and the moving seat to selectively hold the pushing rod and the moving seat in place on the sliding board and confirm a cutting angle of the workpiece, wherein a distance between the first locking device and the saw blade is shorter than that between the second locking device and the saw blade.

2. The feeding device as claimed in claim 1, wherein:
   the first locking device comprises a threaded rod extending through the pushing rod and a sliding block slidably received in a corresponding one of the two grooves in the sliding board, the sliding block having a threaded hole defined therein and the threaded rod screwed into the threaded hole to hold the sliding block in place; and
   the second locking device comprises a threaded rod extending through the moving seat and a sliding block slidably received in a corresponding one of the two grooves in the sliding board, the sliding block of the second locking device having a threaded hole defined therein and the threaded rod of the second locking device screwed into the threaded hole in the sliding block of the second locking device to hold the sliding block of the second locking device in place.

3. The feeding device as claimed in claim 1, wherein the moving seat comprises a rail laterally extending therefrom and having a T-shaped cross-section, and the pushing rod comprises a sliding groove laterally defined in a second side of the pushing rod for slidably receiving the rail of the moving seat.

4. The feeding device as claimed in claim 1 further comprising a graduation plate securely attached to the sliding block of the second locking device, the graduation plate having a series of scales formed on an arc edge thereof, thereby the moving seat includes an indicator attached to one end of the moving seat and corresponding to the series of the graduation plate for indicating an operating angle of the moving seat and the pushing rod.

5. The feeding device as claimed in claim 2, wherein the threaded rods of the first locking device and the second locking device each has a handle extending therefrom for easily operating the threaded rods.

6. The feeding device as claimed in claim 2, wherein the moving seat comprises a rail laterally extending therefrom and having a T-shaped cross-section, and the pushing rod comprises a sliding groove laterally defined in a second side of the pushing rod for slidably receiving the rail of the moving seat.

7. The feeding device as claimed in claim 2 further comprising a graduation plate securely attached to the sliding block of the second locking device, the graduation plate having a series of scales formed on an arc edge thereof, thereby the moving seat includes an indicator attached to one end of the moving seat and corresponding to the series of the graduation plate for indicating an operating angle of the moving seat and the pushing rod.

8. The feeding device as claimed in claim 3 further comprising a graduation plate securely attached to the sliding block of the second locking device, the graduation plate having a series of scales formed on an arc edge thereof, thereby the moving seat includes an indicator attached to one end of the moving seat and corresponding to the series of the graduation plate for indicating an operating angle of the moving seat and the pushing rod.

9. The feeding device as claimed in claim 4, wherein:
the moving seat comprises:
 a bore defined in the moving seat;
 a steel ball movably received in the bore in the moving seat and partially extending through a bottom of the moving seat;
 a spring longitudinally compressively received in the bore in the moving seat for abutting against the steel ball; and
 a blot partially screwed into the bore to hold the steel ball and the spring in place in the bore; and
the graduation plate comprises multiple dimples defined for partially receiving the steel ball, each dimple situated on a certain angle for quickly orientating the moving seat and the pushing rod.

10. The feeding device as claimed in claim 7, wherein:
the moving seat comprises:
 a bore defined in the moving seat;
 a steel ball movably received in the bore in the moving seat and partially extending through a bottom of the moving seat;
 a spring longitudinally compressively received in the bore in the moving seat for abutting against the steel ball; and
 a blot partially screwed into the bore to hold the steel ball and the spring in place in the bore; and
the graduation plate comprises multiple dimples defined for partially receiving the steel ball, each dimple situated on a certain angle for quickly orientating the moving seat and the pushing rod.

11. The feeding device as claimed in claim 8, wherein:
the moving seat comprises:
 a bore defined in the moving seat;
 a steel ball movably received in the bore in the moving seat and partially extending through a bottom of the moving seat;
 a spring longitudinally compressively received in the bore in the moving seat for abutting against the steel ball; and
 a blot partially screwed into the bore to hold the steel ball and the spring in place in the bore; and
the graduation plate comprises multiple dimples defined for partially receiving the steel ball, each dimple situated on a certain angle for quickly orientating the moving seat and the pushing rod.

* * * * *